Sept. 17, 1940.    C. C. FARMER    2,215,350
LOAD BRAKE MECHANISM
Filed Jan. 10, 1936
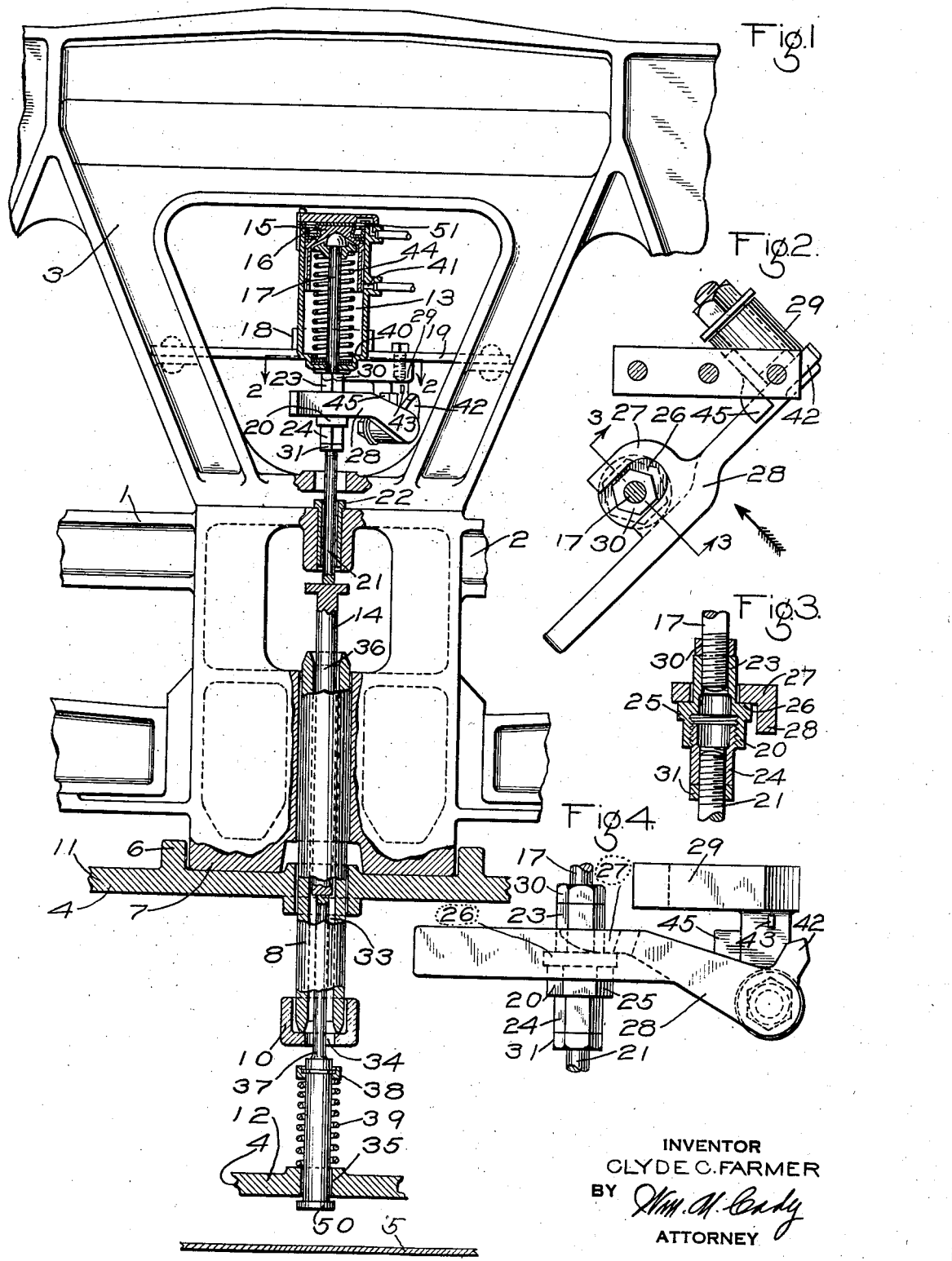
INVENTOR
CLYDE C. FARMER
BY *Wm. M. Cady*
ATTORNEY Patented Sept. 17, 1940

2,215,350

UNITED STATES PATENT OFFICE 2,215,350

LOAD BRAKE MECHANISM

Clyde C. Farmer, Pittsburgh, Pa., assignor to The Westinghouse Air Brake Company, Wilmerding, Pa., a corporation of Pennsylvania Application January 10, 1936, Serial No. 58,488

29 Claims. (Cl. 188—195)

This invention relates to empty and load brake equipment for vehicles and more particularly to that type of equipment which is adapted to be automatically set or conditioned for either light or heavy braking according to the position the body assumes relative to a fixed part of a truck of the vehicle under light and heavy loads.

The mechanism for conditioning the brake equipment is usually carried by the vehicle body and is movable vertically therewith and is adapted to be controlled according to the position which the body assumes relative to a fixed part of the vehicle truck under light and heavy loads. As disclosed in my issued Patents No. 2,077,921, issued April 20, 1937, on an application Serial No. 53,854, filed December 11, 1935, No. 2,077,922, issued April 20, 1937, on an application Serial No. 53,855, filed December 11, 1935, and No. 2,096,487, issued October 19, 1937, on an application Serial No. 55,445, filed December 20, 1935, this fixed part of the truck may be in the form of a strut which may be carried directly by the side frame of the truck, a spring plank or any other support member of the truck.

It is very desirable to have the vertically disposed strut positioned as near as possible to the axis of the pivotal connection between the vehicle body and the truck, so that when the body tilts to one side or the other, due to uneven loading or to uneven track, the strut will not act to cause the change-over mechanism to accidentally move to the improper control position.

The principal object of the invention is to provide an empty and load brake controlling strut construction in which the control strut thereof extends vertically through the center of the pivotal connection between one end of the vehicle and the adjacent supporting truck.

Another object of the invention is to provide an empty and load brake controlling strut which is made up of a plurality of axially aligned cooperating sections for facilitating removal and replacement of the strut as a whole or in part.

A further object of the invention is to provide an empty and load brake controlling strut construction having a controlling strut and a strut cylinder mechanism which are arranged in axial alignment.

Other objects and advantages will appear in the following more detailed description of the invention.

In the accompanying drawing Fig. 1 is a fragmentary cross-sectional view taken through a railway car at one of the center bearings and illustrating the strut construction, portions of the body bolster being broken away to more clearly illustrate the invention; Fig. 2 is an enlarged cross-sectional view taken on the line 2—2 of Fig. 1, the body bolster and truck parts being omitted; Fig. 3 is a vertical sectional view taken on the line 3—3 of Fig. 2; and Fig. 4 is a side elevational view of the portion of the strut construction shown in Fig. 2 as viewed in the direction of the arrow.

Referring now in detail to the drawing, the reference character 1 indicates a portion of a railway hopper car having a body bolster 2 which is provided with a transversely disposed floor support 3 which rises above the bolster into supporting engagement with the adjacent sloping end floor (not shown) of the car body in the usual well known manner.

The supporting trucks for the car body may be of any desirable type and each may comprise the usual side frames (not shown), a transversely extending truck bolster 4 which is carried at its ends by the side frames through the medium of the usual bolster supporting springs (not shown), and may also comprise a transversely extending spring plank or support 5 which is located below the truck bolster and which is carried by the side frames.

The truck bolster 4 is provided with a truck center plate 6 and cooperates with a body center plate 7 carried by the body bolster 2. Accidental separation of the truck and body center plates is adapted to be prevented by means of the usual king pin 8 which extends between the car body and truck and which at its lower end is seated on a support 10 which is located between the upper and lower members 11 and 12, respectively, of the truck bolster 4, and which may be integral with the truck bolster. The body and truck center plates 6 and 7, respectively, and the king pin 8 constitute the necessary pivotal connection between the car body and truck.

The only parts of the empty and load brake equipment which are shown in the drawing of the present application are the strut cylinder mechanism 13 and the control strut 14. The remainder of the empty and load brake equipment may be the same as that fully disclosed in a patent of Earl S. Cook and Ellis E. Hewitt, No. 2,109,366, issued February 22, 1938, on an application Serial No. 51,798, filed November 27, 1935, and in view of this a detailed showing and description of this portion of the equipment is deemed unnecessary in the present application, especially when the invention resides in the means for controlling the operation of the change-over portion of the equipment and the particular arrangement of the strut cylinder mechanism and the control strut with relation to each other and to the pivotal connection between the car body and truck.

The strut cylinder mechanism 13 comprises a vertically disposed cylinder 15 in which is slidably mounted a piston 16 having a downwardly depending piston rod 17 which extends through an accommodating opening in the non-pressure head of the cylinder. The cylinder is provided with a flange 18 which is secured to a support 19 carried by the floor support 3.

Attached to the end of the piston rod 17, by means of a separable coupling 20, is an extension 21 which is slidably guided in a bushing 22 having a press fit with the body bolster 2.

The coupling 20 comprises parts 23 and 24 which are connected together by means of screw threads. The part 23 is provided with a sleeve portion which has screw threaded connection with the end of the piston rod 17, and the part 24 is provided with a similar sleeve portion which has screw-threaded connection with the extension 21. The sleeve portions of the parts 23 and 24 are preferably of hexagonal shape. The part 23 is also provided with a hexagonal portion 25 which has greater dimensions than the hexagonal sleeve portion and forms a shoulder 26 which is adapted to be engaged by the tines of the forked portion 27 of an arm 28 pivotally carried by a bracket 29 secured to the support 19. The clearance space between the tines of the portion 27 and the flat faces of the hexagonal sleeve portion of the section 23 is such that the part 23 cannot be rotated relative to the arm.

The piston stem and part 23 are held against rotation relative to each other by means of a lock nut 30 which has screw-threaded connection with the piston stem 17 and which is adapted to engage the end of the sleeve portion of the part 23. The extension 21 and part 24 are likewise locked together by means of a lock nut 31 which has screw-threaded connection with the extension 21.

The lower end of the extension 21 engages with the upper end of the vertically movable control strut 14, which is in axial alignment with the extension 21 and which passes through a central bore 33 in the king pin 8 and vertically aligned openings 34 and 35 in the bracket 10 and lower member 12, respectively, of the truck bolster.

As shown in Fig. 1 of the drawing the strut preferably comprises two axially aligned sections, 36 and 37, but if desired the strut may be in one piece. The purpose of making the strut in two pieces is to facilitate the assembling and disassembling of the strut construction.

Interposed between and operatively engaging the bottom member 12 of the truck bolster and an annular collar 38 secured to the strut section 37, is a spring 39 which acts to maintain the strut in contact with the lower end of the extension 21.

Assuming the car body and truck to be separated, as would be the case in building the car, and the strut cylinder mechanism 13, bracket 29 and arm 28 mounted on the car body the assembly and adjustment of the strut construction is as follows; the arm 28 and thereby the piston rod 17 and piston 16 are pulled downwardly until the piston 16 is brought to a stop by its engagement with an annular shoulder 40 of the cylinder 15. The piston, just prior to its being thus brought to a stop, uncovers a port 41 through which fluid under pressure is adapted to be supplied from the piston chamber to condition the brake equipment for light braking.

If when the piston is thus stopped, an indicator arm 42, which is carried by the arm 28, does not register with an indicating lug 43 carried by the bracket 29, the lock nut 30 is slacked back and the piston rod 17 is rotated in one direction or the other, as the case may be, until such registration occurs, after which the lock nut is again turned to its locking position and then the arm 28 is released, whereupon a spring 44 acts to move the piston 16, piston rod, coupling 20 and extension 21 upwardly. The arm 28, being in engagement with the coupling 20, will be rocked in a clockwise direction and will be brought to a stop when it strikes a stationary lug 45 carried by the bracket 29. The arm, when it is brought to a stop serves to limit the upward travel of the piston.

In assembling the truck the section 37 of the strut and the spring 39 are mounted on the truck bolster before the truck bolster is positioned on the truck side frames. It will here be noted that the spring 39 will tend to move the section 37 upwardly relative to the truck bolster, but accidental separation of the section is prevented by the engagement of a head 50 on the section with the bottom member 12 of the bolster.

When the several parts of the truck have been assembled the king pin 8 and strut section 36 are dropped in place in the truck bolster. Now when the body is placed on the truck the king pin 8 extends into the body bolster 2 and the lower end of the piston stem extension 21 engages the upper end of the strut section 36 as shown in Fig. 1.

After the body is thus placed on the truck, the one whose duty it is to adjust the strut mechanism, moves the arm 28 downwardly causing the piston 16, piston rod 17, coupling 20, piston rod extension 21 and strut 14 to move downwardly compressing the springs 44 and 39. If the head 50 engages the member 5 of the truck before the indicator arm 42 registers with the lug 43, it will be understood that the effective length of the strut mechanism must be shortened in order to permit the piston 16 to make its full traverse downwardly. This is accomplished by first slacking back the lock nut 31 and then turning the extension 21 further into the coupling member 24 until such time as the indicator arm registers with the lug 43. When this occurs no further turning of the extension is necessary and the lock nut 31 is again turned up into locking engagement with the part 24 of the coupling 20.

If, when the arm 42 is in registration with the lug 43 the head 50 of the strut 14 is not in engagement with the member 5, the extension 21 is turned in the opposite direction to that just described until such time as the head engages the member 5.

When the strut mechanism has been properly adjusted the arm 28 is released whereupon the spring 44 acts to return the piston 16 and thereby the piston rod 17, coupling 20, piston rod extension 21 and arm 28 to their normal position as shown in Fig. 1, and at the same time the spring 39 acts to maintain the strut 14 in close contact with the lower end of the extension 21.

If the car is empty when the brake equipment is being charged with fluid under pressure, fluid under pressure supplied from the usual brake pipe (not shown) to the chamber at the face side of the piston 16, by way of a port 51 in the cylinder 15, causes the piston to move downwardly into engagement with the stop shoulder 40 of the cylinder 15, in which position the piston is below the port 41 and as a consequence fluid under pressure is permitted to flow from the piston chamber to effect the conditioning of the empty and load brake apparatus for light braking. When the brake equipment has been changed over for light braking, the pressure in the piston chamber of the strut cylinder mechanism is reduced in the manner fully described in the aforementioned patent of Earl S. Cook and Ellis E. Hewitt, whereupon the springs 44 and 39 act to return the several parts of the strut cylinder mechanism and strut to their normal position as shown in Fig. 1.

When the car is being loaded the car body and truck bolster as well as the parts carried by either the car body or truck bolster, move downwardly relative to the member 5, the bolster supporting springs yielding to the increasing load in the usual manner. When the car has been loaded to a little more than one-half of its capacity, the truck bolster and thereby the head 50 of the strut 14 will have been moved downwardly relative to the member 5 a sufficient distance that when the brake equipment is initially charged with fluid under pressure and the piston 16 is caused to move downwardly, the head 50 will engage the member 5 and thereby stop the piston in its downward traverse before it can uncover the port 41. With the piston 16 thus stopped, the brake equipment is conditioned for heavy braking in the same manner as fully described in the aforementioned patent of Earl S. Cook and Ellis E. Hewitt. Now when the brake equipment has been changed over for heavy braking, the piston chamber of the strut cylinder mechanism is reduced in the same manner as set forth in the Cook and Hewitt patent, whereupon the springs 44 and 39 act to return the several parts of the strut cylinder mechanism and strut to their normal position.

It will here be noted that when the strut is in its normal position with the car either empty or loaded, the head 50 thereof will be maintained out of engagement with the member 5, so that when the car is in transit, the ordinary unavoidable vertical vacillations of the truck bolster and body relative to the part 5 of the truck will not be permitted to actuate the strut 14, thus eliminating undue wear of the strut and parts associated therewith which would otherwise occur.

From the foregoing description it will be understood that the strut cylinder mechanism and control strut are disposed on the axis of the pivotal connection between one end of the car body and the adjacent truck where its operating characteristics will not be changed when the car body is tilted to one side or the other due to uneven loading, tilted or uneven track or the like.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an empty and load brake apparatus, the combination with a vehicle truck having a fixed part and a part movable vertically relative to said fixed part, of a vehicle body having pivotal connection with the vertically movable part of said truck, a control device operative automatically to effect the conditioning of an empty and load brake equipment for either light or heavy braking, and means extending through the center of the pivotal connection between the vehicle body and the vertically movable part of the truck adapted to cooperate with said control device and said fixed part of the truck to control the operation of said control device according to the movement of the movable part of the truck relative to said fixed part.

2. In an empty and load brake apparatus, the combination with a vehicle truck having a fixed part and a part movable vertically relative to said fixed part, of a vehicle body having pivotal connection with the vertically movable part of said truck, a control device carried by said vehicle body and automatically operative to effect the conditioning of an empty and load brake equipment for either light or heavy braking, and means carried by said truck and extending through the center of the pivotal connection between said vehicle body and truck adapted to cooperate with said fixed part of the truck and said control device for controlling the operation of the control device according to the load carried by the vehicle body.

3. In an empty and load brake apparatus, the combination with a vehicle truck having a fixed part and a part movable vertically relative to said fixed part, of a vehicle body having pivotal connection with the vertically movable part of said truck, and a mechanism operative according to the load carried by the vehicle body to effect the conditioning of an empty and load brake equipment for either light or heavy braking, said mechanism comprising a control element which extends through the center of the pivotal connection between the vehicle body and truck and which is adapted to cooperate with said fixed part of the truck to control the operation of the mechanism.

4. In an empty and load brake apparatus, the combination with a vehicle truck having a fixed part and a part movable vertically relative to said fixed part, of a vehicle body having pivotal connection with the vertically movable part of said truck, and a mechanism operative according to the load carried by the vehicle body to effect the conditioning of an empty and load brake equipment for either light or heavy braking, said mechanism comprising a strut cylinder device for effecting the conditioning of the empty and load brake equipment, and also comprising a strut extending through the center of the pivotal connection between the vehicle body and truck adapted to cooperate with said strut cylinder device and fixed part of the truck for controlling the operation of the strut cylinder device according to the load carried by the body.

5. In an empty and load brake apparatus, the combination with a vehicle truck having a fixed part and a part movable vertically relative to said fixed part, of a vehicle body having pivotal connection with the vertically movable part of said truck, and a mechanism operative according to the load carried by the vehicle body to effect the conditioning of an empty and load brake equipment for either light or heavy braking, said mechanism comprising a strut cylinder device carried by the vehicle body and operative to effect the conditioning of the empty and load brake equipment, and also comprising a strut carried by said truck and extending through the center of the pivotal connection between said vehicle body and truck and adapted to cooperate with said strut cylinder device and fixed part of the truck for controlling the operation of the strut cylinder device.

6. In an empty and load brake apparatus, the combination with a vehicle truck having a fixed part and a part movable vertically relative to said fixed part, of a vehicle body having pivotal connection with the vertically movable part of said truck, and a mechanism operative according to the load carried by the vehicle body to effect the conditioning of an empty and load brake equipment for either light or heavy braking, said mechanism comprising a strut cylinder device carried by the vehicle body and operative to effect the conditioning of the empty and load brake equipment, and also comprising a strut carried by the vertically movable member of the truck and extending through the center of the pivotal connection between said vehicle body and truck and adapted to cooperate with said strut cylinder device and fixed part of the truck for controlling the operation of the strut cylinder device.

7. In an empty and load brake apparatus, the combination with a vehicle truck having a fixed part and a truck bolster movable vertically relative to said fixed part of the truck, of a vehicle body comprising a body bolster having pivotal connection with said truck bolster, a king pin extending centrally through the pivotal connection between the body and truck bolsters, means carried by the vehicle body operative to effect the conditioning of an empty and load brake equipment for either light or heavy braking, and a control element extending through a central bore in said king pin adapted to cooperate with said fixed part of the truck for controlling the operation of said means according to the load carried by the vehicle body.

8. In an empty and load brake apparatus, the combination with a vehicle truck having a fixed part and a part movable vertically relative to said fixed part, of a vehicle body having pivotal connection with the vertically movable part of said truck, a mechanism automatically operative according to the load carried by the vehicle body for effecting the conditioning of an empty and load brake equipment for either light or heavy braking, means for adjusting said mechanism for operation, and means operative manually for indicating whether or not said mechanism is properly adjusted.

9. In an empty and load brake apparatus, the combination with a vehicle truck having a fixed part and a part movable vertically relative to said fixed part, of a vehicle body having pivotal connection with the vertically movable part of said truck, a mechanism automatically operative according to the load carried by the vehicle body for effecting the conditioning of an empty and load brake equipment for either light or heavy braking, means for adjusting said mechanism for operation, and means pivotally connected to the vehicle body and operative manually to indicate whether or not said mechanism is properly adjusted.

10. In an empty and load brake apparatus, the combination with a vehicle truck having a fixed part and a part movable vertically relative to said fixed part, of a vehicle body having pivotal connection with the vertically movable part of said truck, a mechanism automatically operative according to the load carried by the vehicle body for effecting the conditioning of an empty and load brake equipment for either light or heavy braking, means for adjusting said mechanism for operation, and means manually operative in one direction to indicate whether or not said mechanism is properly adjusted and automatically operative in the opposite direction to limit the movement of said mechanism.

11. In an empty and load brake apparatus, the combination with a truck and a vehicle body mounted on said truck, of a control mechanism operative according to the load on the vehicle body for effecting the conditioning of an empty and load brake equipment for either light or heavy braking, said control mechanism having a predetermined position for conditioning the empty and load brake equipment for light braking, means for adjusting said control mechanism, and means manually operative to indicate whether or not the control mechanism is in said predetermined position.

12. The combination with a vehicle truck having a fixed part and a part movable vertically relative to said fixed part, a vehicle body mounted on the vertically movable part of the truck, an empty and load brake change-over device carried by said body and operative according to variations in the distance between said body and fixed part of the truck to effect the conditioning of an empty and load brake equipment for either light or heavy braking, and a strut movable by said device into engagement with said fixed part of the truck for controlling the operation of said device.

13. In an empty and load brake apparatus, the combination with a vehicle truck having a vertically movable element and a relatively fixed element, of a vehicle body pivotally carried by the vertically movable truck element, and means adapted to cooperate with said body and relatively fixed truck element to effect the conditioning of an empty and load brake equipment for either light or heavy braking according to the load carried by the body, said means cooperating with the relatively fixed truck element at a point located in vertical alignment with the axis of the pivotal connection between the vertically movable truck element and the vehicle body.

14. In an empty and load brake apparatus, the combination with a vehicle truck having a vertically movable element and a relatively fixed element, of a vehicle body pivotally carried by the vertically movable truck element, and means adapted to cooperate with said body and relatively fixed truck element to effect the conditioning of an empty and load brake equipment for either light or heavy braking according to the load carried by the body, said means comprising a strut cylinder device carried by said body operative to condition the brake equipment, and a strut mechanism constructed and arranged to cooperate with the relatively fixed part of the truck at a point located in vertical alignment with the pivotal connection between the movable truck element and the vehicle body for controlling the operation of the strut cylinder device according to the load carried by the body.

15. In an empty and load brake apparatus, the combination with a vehicle truck having a fixed part and a part movable vertically relative to said fixed part, and means associated with said body and adapted to cooperate with said fixed part of the truck at a point located in vertical alignment with the axis of the pivotal connection between said body and movable part of the truck to effect the conditioning of an empty and load brake equipment for either light or heavy braking according to the load carried by the body.

16. In a railway car having a fluid pressure brake system provided with apparatus for varying the braking power of the system according to the light or loaded condition of the car, the combination with a pivoted truck having a spring supported bolster, of means for controlling operation of said apparatus including a member movable different distances depending upon the condition of loading of the car, and mechanism for controlling the extent of movement of said member including means relatively movable with respect to the truck bolster in a line substantially coincident with the pivotal axis of the truck and in accordance with the condition of loading of the car.

17. In a railway car having a fluid pressure brake system provided with apparatus for varying the braking power of the system according to the light or loaded condition of the car, the combination with a center sill and a truck bolster respectively having openings for receiving a center pin to pivotally connect a truck to the car, of valve means for controlling operation of said apparatus including a member movable different distances depending upon the condition of loading of the car, and mechanism for controlling the extent of movement of said member, said mechanism including means movable within said center pin receiving openings of the truck bolster and center sill in accordance with the condition of loading of the car.

18. In a railway car having a fluid pressure brake system provided with apparatus for varying the braking power of the system according to the light or loaded condition of the car, the combination with a pivoted truck having side frames and a spring supported bolster, of valve means for controlling operation of said apparatus including a member movable different distances according to the light or loaded condition of the car, and mechanism for controlling the extent of movement of said member, said mechanism including means relatively movable to said bolster in a line substantially coincident with the pivotal axis of the truck and an abutment carried by at least one of said side frames for limiting relative movement in one direction of the bolster and said last named means.

19. In a railway car having a fluid pressure brake system provided with apparatus for varying the braking power of the system according to the light or loaded condition of the car, the combination with a pivoted truck having side frames and a spring supported bolster, said bolster having a center pin receiving opening, of valve means for controlling operation of said apparatus including a member movable different distances according to the light or loaded condition of the car, and mechanism for controlling the extent of movement of said member, said mechanism including a member relatively movable with respect to the truck bolster and disposed within the center pin opening thereof, and means carried by at least one of said side frames for limiting relative movement of said last named member in one direction with respect to the truck bolster.

20. In a railway car having a fluid pressure brake system provided with apparatus for varying the braking power of the system according to the light or loaded condition of the car, the combination with a truck pivoted to the car and having a spring supported bolster, of valve means for controlling operation of said apparatus including a member movable in a line substantially coincident with the pivotal axis of the truck, said member being movable different distances according to the light or loaded condition of the car, and mechanism for controlling the extent of movement of said member including means relatively movable with respect to the bolster in a line substantially coincident with the pivotal axis of the truck.

21. In a railway car having a fluid pressure brake system provided with apparatus for varying the brake power of the system according to the light or loaded condition of the car, the combination with a center sill, a pivoted truck having a spring supported bolster, a center pin pivotally connecting the truck to the center sill and having an opening extending longitudinally therethrough, of valve means for controlling operation of said apparatus including a member movable different distances according to the light or loaded condition of the car, and mechanism for controlling the extent of movement of said movable member including a member relatively movable with respect to the center pin and extending into the opening thereof.

22. In a railway car having a fluid pressure brake system provided with apparatus for varying the braking power of the system according to the light or loaded condition of the car, the combination with a truck pivoted to the car and having a spring supported bolster, said bolster being provided with a bottom wall having an opening therein in substantial alignment with the pivotal axis of the truck, of valve means for controlling operation of said apparatus including a member movable different distances according to the light or loaded condition of the car, and mechanism for controlling the extent of movement of said member, said mechanism including a member projecting through the opening in the bottom wall of the truck bolster and being relatively movable with respect to the truck bolster in a line substantially coincident with the pivotal axis of the truck.

23. In a railway car having a fluid pressure brake system provided with apparatus for varying the braking power of the system according to the light or loaded condition of the car, the combination with a pivoted truck having side frames and a spring supported bolster, of valve means for controlling operation of said apparatus including a member movable different distances according to the light or loaded condition of the car, and mechanism for controlling the extent of movement of said movable member, said mechanism including a member relatively movable to said bolster in a line substantially coincident with the pivotal axis of the truck, and means connected to said side frames and extending transversely of the car beneath the bolster affording an abutment limiting downward movement of said last named member.

24. In a railway car having a fluid pressure brake system provided with apparatus for varying the braking power of the system according to the light or loaded condition of the car, the combination with a pivoted truck having side frames and a spring supported bolster, of valve means for controlling operation of said apparatus including a member movable different distances according to the light or loaded condition of the car, and mechanism for controlling the extent of movement of said movable member, said mechanism including a vertically disposed member slidable relatively to said bolster in a line substantially coincident with the pivotal axis of the truck, spring means for maintaining said slidable member in an elevated position, and means connected to said side frames for limiting downward movement of said slidable member.

25. In a railway car having a fluid pressure brake system provided with apparatus for varying the braking power of the system according to the light or loaded condition of the car, the combination with a pivoted truck having side frames and a spring supported bolster, of a center pin pivotally connecting the truck to the car and having an opening extending longitudinally therethrough, of valve means for controlling operation of said apparatus including a member movable different distances according to the light or loaded condition of the car, and mechanism for controlling the extent of movement of said movable member, said mechanism including a member extending within the opening of the center pin and relatively slidable with respect to said pin, spring means for maintaining said last named member in an elevated position, and means connected to at least one of the side frames of the truck for limiting downward movement of said last named member.

26. In a railway car having a fluid pressure brake system provided with apparatus for varying the braking power of the system according to the light or loaded condition of the car, the combination with a pivoted truck having side frames and a spring supported bolster, said bolster having a bottom wall provided with an opening in alignment with the pivotal axis of the truck, of valve means for controlling operation of said apparatus including a member movable different distances according to the light or loaded condition of the car, and mechanism for controlling the extent of movement of said movable member, said mechanism including a substantially vertical member projecting through the opening in the bottom wall of the truck bolster and being relatively movable with respect to the bolster in a line substantially coincident with the pivotal axis of the truck, and spring means encircling said vertical member above the bottom wall of the bolster for normally maintaining said member in an elevated position.

27. In a railway car having a fluid pressure brake system provided with apparatus for varying the braking power of the system according to the light or loaded condition of the car, the combination with a truck pivoted to the car and having a spring supported bolster, of valve means for controlling operation of said apparatus including an element movable different distances according to the light or loaded condition of the car, and mechanism for controlling the extent of movement of said movable element, said mechanism including a plurality of elongated members arranged one above the other and relatively movable with respect to the truck bolster in a line substantially coincident with the pivotal axis of the truck, and means engageable with the lower one of said members for limiting downward movement of said members relatively to the truck bolster.

28. In a railway car having a fluid pressure brake system provided with apparatus for varying the braking power of the system according to the light or loaded condition of the car, the combination with a truck pivoted to the car and having side frames and a spring supported bolster, of valve means for controlling operation of said apparatus including a member movable different distances according to the light or loaded condition of the car, and mechanism for limiting movement of said movable member, said mechanism including a member relatively slidable with respect to the bolster in a line substantially coincident with the pivotal axis of the truck, and means extending within the bolster and connected to the side frames of the truck affording a stop limiting movement of said slidable member in one direction.

29. In a railway car having a fluid pressure brake system provided with apparatus for varying the braking power of the system according to the light or loaded condition of the car, the combination with a pivoted truck having a spring supported bolster, of means controlling the operation of said apparatus, said means including a member relatively movable with respect to the truck bolster in a line substantially coincident with the pivotal axis of the truck and for different distances respectively corresponding to the condition of load of the car.

CLYDE C. FARMER.